United States Patent Office 3,244,635
Patented Apr. 5, 1966

3,244,635
SORBENT PRODUCTS AND METHOD FOR MAKING SAME FROM ATTAPULGITE CLAY
James B. Duke, Metuchen, N.J., assignor to Minerals & Chemicals Philipp Corporation, Menlo Park, N.J., a corporation of Maryland
No Drawing. Filed Sept. 10, 1962, Ser. No. 222,681
13 Claims. (Cl. 252—89)

The present invention relates to improved attapulgite clay sorbent products and to the method for producing same. The invention relates especially to mineral sorbent particles of the type used as a floor cleaning agent and will be described with particular reference to this application.

Oily, greasy or wet floors, especially those in garages and industrial plants, are commonly cleaned by spreading a layer of sorbent mineral particles over the area to be cleaned. The mineral particles with sorbed grease, oil and/or water are then swept and discarded.

One of the mineral materials that finds widespread use in the production of floor cleaning sorbents is attapulgite clay, a unique type of clay material mined in Georgia and Florida. The raw clay as mined leaves much to be desired for use as a floor cleaning sorbent, and the clay normally undergoes a series of processing steps to put it into a form for which it is better suited for this use. For example, a floor cleaning sorbent, in addition to having good oil and water sorptivity, should be in the form of coarse aggregates, typically particles −10 +42 mesh (Tyler series) to facilitate application of the sorbent to the floor. These particles should be free from fines (i.e., particles 100 mesh or smaller) since the presence of fines will create a dust hazard. Moreover, the particles should be sufficiently hard or resistant to attrition that they will not break down appreciably into finer particles during use. The particles should also have as low a bulk density or volume weight as is consistent with adequate hardness since the lower the density of the sorbent, the greater is the floor coverage of the material on a unit weight basis.

To impart hardness and sorptivity to raw attapulgite clay and to put it into granular form, it is conventional to pug the clay with water to form an extrudable mixture, extrude the pugged clay to obtain pellets, calcine the pellets to harden them sufficiently to permit their grinding and to activate the clay, and then grind the calcined pellets and size them. The nature of extruded attapulgite clay pellets that have been calcined at a temperature and for a time sufficient to activate the clay is such that considerable fines are produced when the calcined pellets are ground to reduce them into granules of the required mesh size. Therefore, the calcination step preceding the grinding step must be a two-stage operation, with the initial stage being in the nature of a drying operation and the second stage being a high temperature operation which activates the clay by removing a substantial quantity of chemically combined water. Even with the use of a double calcination step to minimize the production of by-product fines, in commercial practice as much as 15% to 25% of the starting attapulgite clay ends up in the form of fines. A small quantity of the fines can be recycled in the process and mixed with the extruder feed. However, the fines are composed of calcined clay which does not possess the extrusion properties of the raw feed clay. As a result, the majority of the by-product fines represents waste material for which there is a very limited market.

From this brief description of the prior art commercial method for making an attapulgite clay floor cleaner, it will be readily apparent to those skilled in the art that processing costs add appreciably to the cost of the raw attapulgite clay. Thus, extrusion is a rather expensive process, especially since the raw clay feed contains abrasive impurities which wear out the die plate of the extruder, necessitating rather frequent replacement of the equipment. Double calcination is also uneconomical for obvious reasons. Added to these costs is the expense represented by wastage of raw materials as by-product fines on which expensive extrusion and calcination treatments have been expended.

As for the floor cleaning granules obtained from attapulgite clay by extrusion, calcination and grinding, they possess excellent oil and water sorptivity. The hardness or attrition resistance of the extruded granules is adequate for many applications although producers of the granules have continually directed their efforts to improving this property of the material. The extrusion step which enhances the sorptivity of the finished calcined clay also results in a moderate and desirable decrease in bulk density of the calcined clay. Thus, for example, a commercial calcined attapulgite clay which will have a bulk density of say 35 lbs./ft.$^3$ if it has not been extruded will have a bulk density of the order of 30 lbs./ft.$^3$ if it has also been subjected to extrusion. However, the bulk density and, therefore, the covering properties of the extruded calcined granules still leaves much to be desired. While many attempts have been made in the past to produce attrition resistant, heat activated attapulgite clay granules of very low bulk density, no commercially feasible method has been advanced which markedly reduces bulk density without adversely affecting other desirable properties of the material, especially hardness. The same difficulty is experienced in reconciling hardness with low density in producing attapulgite clay granules which are merely dried to reduce the amount of physically held water.

It has been suggested in my copending application, Serial No. 169,664, filed January 26, 1962, to produce a lightweight attapulgite clay granular product by pressing a moistened mass of a colloidal grade of clay between the peripheral surfaces of counterrotating rolls, scraping the pressed mixture from the rolls, heating, crushing and then sizing the pressed mixture from the rolls. Virtually dust-free lightweight flakes have been produced in excellent yields by this procedure. However, the hardness of the flakes has been markedly inferior to the hardness of granules obtained by extrusion unless fairly large quantities of chemical reagents were incorporated in the moistened clay feed. Even when the chemical additives were employed, the flakes obtained by pressing the plasticized clay between rolls operating at the same peripheral speeds were at best only slightly superior to the hardness of granules obtained by extrusion.

An object of this invention is the provision of a process for making exceptionally hard lightweight attapulgite clay sorbent particles by a process which obviates the need for extrusion equipment.

Another object is the provision of a method for making attapulgite clay sorbent particles wherein minimal production of by-product fines occurs.

A more particular object of this invention is the provision of lightweight attapulgite sorbent aggregates by an inexpensive process in which chemical additives to the clay are not required to obtain noteworthy hardness.

A further object of this invention is the provision of sorbent aggregates of attapulgite clay which are lower in bulk density than, and also materially harder than, extruded granules of attapulgite clay of the same particle size and moisture content.

Still another object of this invention is the provision of a heat activated attapulgite clay sorbent product which is superior in its ability to absorb oil to activated attapulgite clay to granules obtained by extrusion.

Other objects and advantages of this invention will be apparent from the description thereof which follows.

This invention results from the discovery that markedly harder and superior attapulgite clay sorbent aggregates can be produced by a process in which moistened clay is fed between closely spaced counterrotating rolls when the rolls are operated at different peripheral speeds. This result was most surprising and unexpected since operation of the rolls at different speeds results in a pronounced shearing of the clay between the rolls, an action which would have been expected to break down the structure of the clay material and produce a softer product.

Briefly stated, the process for producing improved sorbent particles from attapulgite clay, in accordance with the subject invention, comprises the following essential steps: (1) a colloidal grade of attapulgite clay is uniformly moistened with water to a plastic consistency; (2) the moist plastic clay is continuously fed between hard unyielding peripheral surfaces of counterrotating rolls rotating at different peripheral velocities with a clearance within the range of 0.005 inch to 0.020 inch; (3) the moist clay, after it has passed between the rolls, is continuously scraped simultaneously from the peripheral surface of each of the rolls, thereby forming a multiplicity of cohesive flake-like particles of moist clay; (4) the flakes are heated to reduce their moisture content to a level at which they can be crushed; and (5) the flakes are crushed and sized to recover small flake-like particles of the desired mesh size. Depending upon the properties that are desired in the finished attapulgite product, the aforementioned heating step can be a mild drying step, sufficient to remove merely some or all physically held water from the clay, or it can be a calcination step sufficient to remove some or substantially all of the lattice water from the clay. Generally speaking, products of this invention which have been calcined will be harder than and lower in bulk density than products of this invention which have been mildly dried but not calcined.

By the procedure briefly described above, 95% yields of heat activated attapulgite clay sorbent aggregates have been obtained without the necessity for extrusion or double calcination. These calcined particles have a thickness within the limits of about 0.015 inch to about 0.025 inch. The width of the particles in the calcined product is within the range of about 0.05 inch to about 0.13 inch and is controlled by the crushing and sizing operation. Particles having dimensions of this order, and which have been processed as described above, have a bulk density (defined hereinafter) within the range of about 20 to about 24 lb./ft.$^3$. These values are significantly lower than the bulk density of attapulgite granules of the same mesh size and volatile matter content obtained by extrusion, followed by calcination and grinding. Therefore, attapulgite clay sorbent particles of this invention effectively cover considerably greater floor area per pound than prior art attapulgite clay floor cleaner granules. Aggregates produced in accordance with this invention by shearing water plasticized attapulgite clay between closely spaced counterrotating rolls operating at different peripheral speeds are also substantially harder than attapulgite clay granules of the same mesh size and volatile matter content. By way of illustration, a representative calcined product of this invention was found to be 20% to 30% harder than extruded calcined attapulgite clay granules of about the same mesh size and moisture content and about 75% harder than calcined attapulgite clay aggregates obtained with counterrotating rolls operating at the same peripheral speed. Therefore, the attapulgite clay product of this invention will maintain its particle form without breaking down into fines when subjected during use or handling to mechanical forces which would cause other attapulgite clay sorbent particles to disintegrate. The oil retention of the sorbent particles, on a weight and volume basis, is markedly superior to the oil retention of extruded granules. Therefore, the product of this invention will be more efficient in cleaning oily floors than the commercial granules.

The use of attapulgite as the colloidal clay material is an essential feature of this invention and the above-mentioned advantages of this invention are not realized by substituting other colloidal clays, such as bentonites, for the attapulgite clay.

More specifically, the starting clay employed in carrying out this invention may be any grade of colloidal attapulgite clay. By the term "colloidal attapulgite clay" is meant attapulgite clay which has never been dried to a free moisture content below about 7%. "Free Moisture" or "F.M." is the weight percentage of the clay that is eliminated by heating the clay to constant weight at about 220° F. The term "volatile matter" or "V.M." is defined as the weight percentage of a material that is eliminated when the material is heated to essentially constant weight at 1800° F. In the case of clay per se, water accounts substantially completely for the volatile matter. Raw attapulgite clay as mined is suitable after crushing and after its moisture content has been adjusted, when necessary, by addition of water. The F.M. of raw clay is usually about 44% and its V.M. is about 50%, although there can be considerable variations from these values, depending upon ambient conditions. Degritted colloidal attapulgite clay may be preferred to the crude clay when the presence of grit is detrimental to the end product. For reasons of economy, by-product extruded attapulgite clay fines, obtained in various crushing and screening operations, can be incorporated with the raw clay.

Normally, the V.M. of the raw clay is inadequate to obtain optimum benefit of the rolling step and the raw clay must then be uniformly moistened with water to bring its V.M. to the preferred range of about 55% to 65%. The moistening of the clay with water can be carried out by mixing the raw clay, crushed to about minus 2 inches or minus 4 inches, in a pug mill, cement mixer or kneader. When plant by-product attapulgite clay fines are to be incorporated with the charge clay, it is preferable to mix the colloidal attapulgite clay with the water and then incorporate the fines, employing sufficient water in the moistening operation to account for the fact that the fines have a lower V.M. than the raw clay. Products obtained with attapulgite clay having too low a V.M., e.g., clay having a V.M. of about 50%, will usually be softer and heavier than attapulgite clay products obtained with charges having a higher V.M. On the other hand, when the V.M. of the clay charge to the roll flaker is excessive, e.g., above 65%, the charge will be too fluid and optimum product hardness will not be obtained. The optimum V.M. of the clay charged to the counterrotating rolls will vary somewhat with roll clearance and is usually within the limits of about 57% to about 63%. While the charge to the roller consists essentially of clay and water, it is within the scope of this invention to include other material with the moist clay, as examples of which may be mentioned recycle attapulgite clay fines, flocculating agents (e.g., alum, mineral acids, certain surface active agents such as tall oil soaps) and inert diluents. The use of clay dispersants (deflocculating agents), such as sodium silicate or molecularly dehydrated phosphates, should be avoided since they fluidize the clay-water system and are detrimental to the end product. When the sorbent aggregates are used as carriers or binders for materials such as zeolites, herbicides, insecticides or pesticides, appropriate ingredients can be mixed with the clay before the clay is charged to the counterrotating rolls.

The moistened clay is fed uniformly through the length of the bite or nip between smooth surfaced counterrotating rolls. The rolls, which must have hard unyielding peripheral surfaces and preferably have equal diameters, are rotatably supported at each end as by journalled shafts. Any suitable means can be employed to maintain the clearance between the peripheral surfaces of the rolls at a constant value within the range of 0.005 inch to 0.020 inch. Since the compressed plastic clay tends to expand somewhat after passing between the rolls, the clearance between the rolls is less than the desired thickness of the flaked clay mass. When the roll clearance is less than about 0.005 inch, the hardness of the finished aggregates will not be satisfactory. With roll clearance greater than 0.020 inch, the bulk density of the finished aggregrates tends to increase. Especially recommended are constant roll clearances within the range of about 0.006 inch to 0.011 inch. As mentioned, an essential feature of the process is that the rolls are geared to rotate at different peripheral velocities. In order to obtain high product output, high peripheral velocities are employed. Excellent results have been obtained with the slower roll rotating at 250 to 500 ft./min. and with the faster roll rotating at 250% the peripheral velocity of the slower roll. When the difference between the peripheral velocities of the rolls is too low, such as, for example, when the faster roll rotates at only double the speed of the slower roll, the results, in terms of product hardness, may not be as good when a greater differential is employed. When the faster roll rotates at a peripheral speed which is less than about 25% greater than the speed of the other roll, the results may not differ appreciably from the results obtained when the rolls are operated at the same speed. This could be explained by the fact that the degree of shearing of the moist clay increases with differential in roll speed and that product hardness is improved by extensive shearing of the moist clay. Practical limitations limit the maximum roll speed.

The rolling operation is carried out cold without heating of the rolls or clay in order to avoid any drying effect which would be detrimental to the product since the plasticity of the feed should be maintained during the rolling operation.

The moistened clay issues from the bite between the rolls as a compacted coherent film which tends to adhere to surfaces of the rolls. This film is removed simultaneously from each roll by means of doctor blades mounted tangentially to the rolls with the scraping edge coextensive with and in surface contact with the periphery of the rolls.

The action of the knife blade against the surface of the roll is to remove a freshly rolled portion of moist feed clay from the roll. The nature of the clay feed is such that the clay is removed from each roll in the form of discrete coherent flakes, as opposed to ribbons or sheets. These flakes are of substantially uniform thickness.

The moist clay flakes are discharged from each of the rolls into a suitable hopper and can then be charged into a calciner in which the flakes are calcined, preferably at a temperature within the range of about 800° F. to about 1200° F. to a V.M. of about 3% to 5%. In some instances, it may be desirable to calcine the flakes to a lower V.M., say a V.M. as low as about 1% or as high as about 10%. To produce attapulgite aggregates having a relatively high V.M., such as products having a V.M. of about 10% to 35%, a mild drying of the flakes at temperatures of the order of 200° F. to 400° F. will suffice. The material from the dryer or from the calciner is cooled and then screened. The oversize flakes from the screening operation are passed to a suitable mill, such as a corrugated hard surfaced roller mill, to be reduced to particles of the desired mesh size, screened, and particles of the desired mesh size passed to storage. Fines, which normally account for less than 10%, and more usually only 5%, of the feed clay, are discarded or returned to the pug mill. Milling and screening are normally adjusted to provide a product which is about 100% −4 mesh and about 100% +42 mesh (Tyler series). The particle size of this product may vary to some extent within this range, e.g., −8 +32 mesh, −9 +32 mesh, and −12 +42 mesh.

The following examples are given to further illustrate this invention and to show its advantages over those employed heretofore. These examples are merely illustrative and are not to be considered as limiting the scope of the invention.

EXAMPLE I

A. In accordance with this invention, hard lightweight attapulgite clay sorbent particles were produced by pugging attapulgite clay with water at 61% V.M. for 10 minutes in a sigma blade pug mill. The pugged material was continuously fed between the peripheral surfaces of two counterrotating rolls each 8" diameter x 4" long and set at 0.006" constant clearance. One roll turned at 425 r.p.m. (888 ft./min.) while the other roll turned at 170 r.p.m. (353 ft./min.), representing a peripheral speed ratio of 2.5:1. The clay was continuously scraped from the rolls by steel doctor blades. The throughput rate was 100 pounds per hour of volatile-free clay. (50 pounds volatile-free clay per lineal inch of roll surface). The flakes produced in this manner were calcined in a rotary calciner (air inlet temperature 1890° F.) to a V.M. of 1%, crushed and screened to pass a 6 mesh screen.

The −6 +42 mesh product was evaluated and compared with commercial attapulgite clay granules of similar mesh size obtained by pugging, extrusion, drying, crushing and calcining, with the results shown below.

Table I

|  | Commercial Attapulgite Clay Adsorbent Granules | Product of This Invention |
|---|---|---|
| Yield, Percent | 82 | 98 |
| Hardness, Percent | 60 | 72 |
| Bulk Density, lbs./ft.³ | 25.1 | 22.3 |
| Water Retention, Percent | 180 | 175 |
| Oil Retention, Percent | 93 | 108 |

The results in Table I show that by carrying out the process of this invention there can be obtained an attapulgite clay sorbent product which is considerably lighter than a commercial attapulgite clay sorbent product and also considerably harder. The data show also that the sorbent of this invention had a higher oil retention value than commercial granules at about the same water retention value, indicating that improved cleaning of oily floors could be obtained by using the product of this invention. The data also show that the recovery of clay was considerably better in carrying out the process of this invention than in a commercial process for producing attapulgite clay sorbent granules by extrusion.

EXAMPLE II

In Table II are shown properties of heat activated sorbent particles obtained by treating raw attapulgite clay from a deposit near Attapulgus, Georgia, by the differential roll flaking technique of this invention. For purposes of comparison, there are included properties of sorbent particles of the same size and moisture content produced with rolls operating at the same peripheral speed. Included in this table are data showing the desirability for adjusting the volatile material of the charge clay to the differential rolls above the 50% level.

The general procedure for making flaked products of this invention was as follows. Raw run of the mined attapulgite clay was crushed into lumps about 2 to 4 inches. Portions of the crushed clay were pugged in a sigma blade pug mill with water to various V.M. levels. Clay samples having V.M. values of 49.9% up to about 61% were each passed through the bite between the 4" x 8" diameter smooth steel surfaced counterrotating rolls rotating at different speeds and with constant roll clearances which are recorded in the table. After passing the clay through the rolls, the clay was removed in flake form from each roll with steel doctor blades mounted tangentially to each roll at an angle of about 15 degrees. The flakes were calcined to a V.M. of 3% to 4% in a rotary calciner at a temperature of about 1050° F. for 30 minutes or in a muffle calciner at a temperature of about 1100° F. for 45 to 60 minutes, milled and screened.

Some runs were also made on samples of pugged clay with the 4" x 8" diameter rolls rotating at the same speed and under high spring tension controlled to compress the feed to a thickness within the range of about 0.025 inch to about 0.050 inch. These samples were calcined, milled and screened as described above.

A comparison of data in Table II with the data in Table I for commercial attapulgite granules obtained by extrusion show that attapulgite products having hardness values significantly greater than the 60% hardness of commercial attapulgite clay granules could not be obtained simultaneously with a reduction in bulk density from the 25.1% density value of the commercial extruded granules by operating the flaking rolls at the same speed (Samples 1 and 2). The data show also that the optimum yield of clay product of the desired mesh size obtained with the rolls counterrotating at the same speed was 91.3%. In contrast with results obtained with the rolls counterrotating at the same speed, the data for products obtained with the roll operating at different speeds (Samples 3 to 8) show that products both lighter than the commercial granules and harder than the commercial granules were obtained. The data show also that of the samples produced with the rolls operating at different speed, samples produced by charging the rolls with clay moistened to about 55% to about 61% V.M. (Samples 4, 5, 6 and 8) were markedly harder than, and generally somewhat lighter than, products obtained with the rolls charged with clay at the lower V.M. (Samples 3 and 7).

minutes. The pugged material was fed between the 4" x 8" diameter counterrotating rolls with the rolls set apart a distance of 0.012" and with one roll turning at 1200 ft./min. and the other turning at 500 ft./min. The material on the rolls was continuously removed with steel doctor blades and the green flakes muffle calcined at 1100° F. for one hour, crushed and screened to pass a 6 mesh screen and be retained on a 35 mesh screen.

*Table III*

EFFECT OF INCORPORATING ATTAPULGITE CLAY PLANT FINES INTO ROLL FLAKER CHARGE

| −6 +35 Mesh Product Yield, Percent | Attapulgite Fines Used in Processing | | Properties of Sorbent Product | |
|---|---|---|---|---|
| | V.M. As Produced, Percent | Extruded Fines in Charge, Percent (Based on weight of raw clay) | Bulk Density, lbs./ft.³ | Hardness, Percent |
| 94.4 | 9 | 10 | 20.9 | 75 |
| 95.9 | 9 | 25 | 20.4 | 74 |
| 91.3 | 6 | 10 | 21.2 | 70 |
| 95.0 | 6 | 20 | 21.1 | 69 |

The data in Table III show that waste calcined attapulgite clay fines can be pugged with the raw clay charge to the differential roll flaker to product sorbent flakes both harder than and lighter than commercial clay extruded

*Table II*

EFFECT OF FLAKING CONDITIONS ON PROPERTIES OF ROLL FLAKED ATTAPULGITE CLAY ABSORBENTS (−8 +42 MESH)

| Sample Number | Clay Treatment Before Calcination, Milling and Screening | Rolling Conditions | | | Properties of Calcined Sorbent Product | | |
|---|---|---|---|---|---|---|---|
| | | Roll Clearance (inch) | Roll Speed, r.p.m. | | Yield, percent | Bulk Density, lbs./ft.³ | Hardness, percent |
| | | | Front Roll | Back Roll | | | |
| | PRODUCTS OBTAINED WITH SAME ROLL SPEEDS | | | | | | |
| 1 | Clay pugged with water to 61.9% V.M., roll flaked | ¹ 0 | 190 | 190 | 88.9 | 21.9 | 42 |
| 2 | ---do--- | 0.017 | 190 | 190 | 91.3 | 25.1 | 64 |
| | PRODUCTS OBTAINED WITH ROLLS OPERATED AT DIFFERENT SPEEDS | | | | | | |
| 3 | Clay at 49.9% V.M., roll flaked | 0.011 | 142 | 330 | 96.3 | 24.3 | 66 |
| 4 | Clay pugged with water to 55.1% V.M., roll flaked | 0.011 | 142 | 330 | 96.4 | 24.5 | 72 |
| 5 | Clay pugged with water to 59.8% V.M., roll flaked | 0.011 | 142 | 330 | 96.0 | 24.4 | 80 |
| 6 | Same as Sample 5 except pugged with 9.6 percent H₂SO₄ roll flaked salt from 58.7% V.M. | 0.011 | 142 | 330 | 96.7 | 23.6 | 78 |
| 7 | Clay pugged with water to 49.9% V.M., roll flaked | 0.007 | ² 164 | ³ 362 | 94.4 | 24.8 | 65 |
| 8 | Clay pugged with water to 61% V.M., roll flaked | 0.007 | 164 | 362 | 95.4 | 22.0 | 70 |

¹ Rolls under high spring tension with zero clearance when no feed was charged to the rolls.
² 344 ft./min.
³ 758 ft./min.

The data in Table II show also that product yield was increased from the optimum yield of 91.3% with rolls at the same speed to 95% to 96% levels by operating the rolls at different speeds. Also shown in the data is that lighter products at somewhat lower hardness values were obtained with the differential rolls by reducing roll clearance.

EXAMPLE III

Minus 42 mesh extruded heat activated attapulgite clay fines obtained as a waste product in producing commercial attapulgite clay absorbent granules were recovered and used in production of lightweight sorbent product by the process of this invention.

Raw attapulgite clay pug mill feed at 50% V.M. was pugged with water to a calculated V.M. of 65% for 10 minutes. Predetermined quantities of recycle fines were then added to the charge and pugging continued for 10 granules of the same particle size. The results indicate that mixtures of the calcined fines could be used with good results. A comparison of results of products made up with recycle attapulgite fines with products made up without recycle fines (Examples I and II) indicates that the effect of the use of calcined recycle fines in the process is to reduce product density without appreciable detriment to product hardness.

The method for determining hardness values used herein is described in U.S. Patent No. 2,665,259 to Buffett. Oil retention values refer to the increase in weight of sorbent sample, expressed as a percent of the original sample, when subjected to the procedure described in said patent to Buffett. Water retention values were measured by the same general procedure used in determining oil retention values with water being substituted for the oil. Mesh sizes are those obtained with Tyler standard screenscale sieves. Bulk density values refer to values obtained by pouring a sample directly into a 100 cc. graduate from a fixed height of 25 inches and determining the weight of the 100 cc. volume.

I claim:

1. A method for making hard lightweight clay sorbent aggregates which comprises:

forming a moist plastic mixture comprising colloidal attapulgite clay and water, without heating, continuously feeding said mixture between the peripheral surfaces of hard and smooth surfaced counterrotating rolls spaced apart a distance between 0.005 inch and 0.020 inch, the peripheral speed of one roll being more than double the peripheral speed of the other roll, simultaneously scraping said mixture from said rolls after said mixture has passed between the peripheral surfaces of said rolls, thereby forming flaked aggregates, heating said aggregates to reduce their moisture content to a level at which they can be crushed, and crushing and sizing the heated aggregates to produce attapulgite clay aggregates of the desired mesh size.

2. A method for making hard lightweight clay sorbent aggregates which comprises:

forming a moist plastic mixture comprising colloidal attapulgite clay and water, without heating, continuously feeding said mixture between the peripheral surfaces of hard and smooth surfaced counterrotating rolls spaced apart a distance between 0.005 inch and 0.020 inch, the peripheral speed of one roll exceeding the peripheral speed of the other roll by at least about 100%, simultaneously scraping said mixture from said rolls after said mixture has passed between the peripheral surfaces of said rolls, thereby forming moist flaked aggregates, heating said aggregates to reduce their moisture content to a level at which they can be crushed, and crushing and sizing the heated aggregates to produce attapulgite clay granules of the desired mesh size.

3. The method of claim 2 in which the peripheral speed of one roll exceeds the peripheral speed of the other roll by about 250%.

4. The method of claim 2 in which the peripheral speed of the slower roll is at least 250 ft./min. and the peripheral speed of the faster roll exceeds the peripheral speed of the other roll by about 250%.

5. A method for making hard granular lightweight clay sorbent granules which comprises:

moistening raw attapulgite clay with water to a volatile matter content within the range of about 55% to about 65%, without heating, continuously feeding said moistened clay between the peripheral surfaces of hard and smooth surfaced counterrotating rolls spaced apart a distance between 0.005 inch and 0.020 inch, the peripheral speed of one roll being at least 250 ft./min. and the peripheral speed of the other roll being more than double the peripheral speed of said first-mentioned roll, simultaneously scraping said moistened clay from said rolls after said moistened clay has passed between the peripheral surfaces of said rolls, thereby forming moist clay aggregates, calcining said aggregates to reduce their volatile matter to an amount within the range of 1% to 10%, and crushing and sizing the heated aggregates to produce attapulgite clay granules of the desired mesh size.

6. The method of claim 5 in which the peripheral speed of one roll exceeds the peripheral speed of the other roll by about 250%.

7. The method of claim 5 in which the peripheral speed of the slower roll is at least 250 ft./min. and the peripheral speed of the faster roll exceeds the peripheral speed of the other roll by about 250%.

8. A method for making hard lightweight clay sorbent aggregates which comprises:

forming a plastic mixture consisting essentially of water, colloidal attapulgite clay and a small amount of calcined extruded attapulgite clay fines, without heating, continuously feeding said mixture between the peripheral surfaces of hard and smooth surfaced counterrotating rolls spaced apart a distance between 0.005 inch and 0.020 inch, the peripheral speed of one roll being at least 250 ft./min. and the peripheral speed of the other roll being more than double the peripheral speed of said first-mentioned roll, simultaneously scraping said mixture from said rolls after said mixture has passed between the peripheral surfaces of said rolls, thereby forming flaked aggregates, heating said aggregates to reduce their moisture content to a level at which they can be crushed, and crushing and sizing the heated aggregates to produce attapulgite clay aggregates of the desired mesh size.

9. A method for producing an improved absorbent useful as a floor cleaner which comprises:

forming a moist plastic mixture consisting essentially of colloidal attapulgite clay and water, said mixture having a V.M. within the limits of about 55% to 65%, continuously feeding said plastic mixture into the bite between hard and smooth surfaced counterrotating rolls without heating said plastic mixture, said rolls rotating at different peripheral speeds with the rolls spaced apart a constant distance between 0.005 inch to 0.020 inch, the slower of said rolls rotating at a peripheral speed of a least 250 ft./min. and the faster roll rotating at more than double said speed, simultaneously scraping the mitxure from each of said rolls tangentially at a position beyond the bite between said rolls so as to remove mixture from said rolls in the form of coherent flaked aggregates, calcining said flaked aggregates, and crushing said calcined aggregates to obtain a sorbent product of the desired mesh size.

10. An attapulgite clay sorbent product in the form of hard flake-like particles about 0.015 inch to about 0.025 inch thick and having a width within the range of about 0.05 inch to 0.13 inch, said particles having been obtained by the process of claim 1.

11. A method for producing an improved granular clay product which comprises:

pugging colloidal attapulgite clay with sufficient water to form a plastic mixture having a volatile matter content within the limits of about 55% to about 65%, continuously feeding portions of said pugged mixture between the peripheral surfaces of hard and smooth surfaced counterrotating rolls without heating said mixture, said rolls being spaced apart a constant distance between 0.006 inch and 0.011 inch, the peripheral speed of one roll being within the range of 250 ft./min. to 500 ft./min. and the peripheral speed of the other roll being about 250% greater than the the speed of said first-mentioned roll, simultaneously scraping said mixture from said rolls after said mixture has passed between the peripheral surfaces of said rolls, thereby forming moist clay aggregates, calcining said aggregates to reduce their volatile matter to an amount within the range of about 1% to about 10%, and crushing said calcined aggregates to obtain a sorbent product of the desired mesh size.

12. A sorbent product useful as a floor cleaner and composed of flake-like particles of attapulgite clay which have been obtained by passing a plastic mass comprising water and colloidal attapulgite clay between counterrotating rolls operating with the faster roll rotating at a peripheral speed that is at least double the peripheral speed of the slower roll and calcining and crushing the rolled clay, said calcined flake-like particles being about 0.015 to about 0.025 inch thick and having a width within the range of about 0.05 to about 0.13 inch, said particles being further characterized by having a volatile matter content of about 1% to about 10% and being substantially harder than attapulgite granules of similar mesh size and obtained by extruding colloidal attapulgite clay, followed by calcination and grinding.

13. A sorbent product useful as a floor cleaner and composed of flakelike particles of attapulgite clay which have been obtained by passing a plastic mass comprising water and colloidal attapulgite clay between counterrotating rolls operating with the faster roll rotating at a peripheral speed that is at least double the peripheral speed of the slower roll and calcining and crushing the rolled clay, said calcined flakelike particles being about 0.015 to about 0.025 inch thick and having a width within the range of about 0.05 to about 0.13 inch, said particles being further characterized by having a volatile matter content of about 1% to about 10% and being substantially harder than and lower in bulk density than attapulgite granules of similar mesh size and obtained by extruding colloidal attapulgite clay, followed by calcination and grinding.

References Cited by the Examiner

UNITED STATES PATENTS

| | | | |
|---|---|---|---|
| 313,572 | 3/1885 | Birch et al. | 241—227 |
| 1,308,007 | 6/1919 | Forsyth | 241—227 |
| 1,713,487 | 5/1929 | Torrance | 241—227 |
| 2,470,346 | 5/1949 | Frankenhoff | 252—88 |
| 3,050,863 | 8/1962 | Allegrini et al. | 252—88 |

ALBERT T. MEYERS, *Primary Examiner.*

JULIUS GREENWALD, *Examiner.*

W. E. SCHULZ, *Assistant Examiner.*